United States Patent [19]
Dubois et al.

[11] Patent Number: 5,057,843
[45] Date of Patent: Oct. 15, 1991

[54] METHOD FOR PROVIDING A POLARIZATION FILTER FOR PROCESSING SYNTHETIC APERTURE RADAR IMAGE DATA

[75] Inventors: Pascale C. Dubois; Jakob J. vanZyl, both of Pasadena, Calif.

[73] Assignee: The United States of America as represented by the Administrator of the National Aeronautics and Space Administration, Washington, D.C.

[21] Appl. No.: 544,293

[22] Filed: Jun. 25, 1990

[51] Int. Cl.$^5$ .................. G01S 13/90; G01S 7/295
[52] U.S. Cl. .................................. 342/25; 342/188
[58] Field of Search .................... 342/25, 179, 188; 382/54

[56] References Cited

U.S. PATENT DOCUMENTS

| | | | |
|---|---|---|---|
| 4,323,898 | 4/1982 | Barnes et al. | 342/188 |
| 4,323,899 | 4/1982 | Barnes et al. | 342/188 |
| 4,660,044 | 4/1987 | Lavelle | 342/188 |
| 4,766,435 | 8/1988 | Wells | 342/188 X |
| 4,829,303 | 5/1989 | Zebker et al. | 342/25 |
| 4,849,762 | 7/1989 | Barnes | 342/188 |

OTHER PUBLICATIONS

Swartz, A. A., Yuen, H. A., Kong, J. A., Novak, L. M. and Shin, R. T., "Optimal Polarizations for Achieving Maximum Contrast in Radar Images," J. Geophys. Res., vol. 93, No. B12, pp. 15252–15260, Dec. 1988.

Zebker, H. A., van Zyl, J. J. and Held, D. N., "Imaging Radar Polarimetry from Wave Synthesis," J. of Geophysical Research, vol. 92, No. B1, pp. 683–701, Jan. 10, 1987.

Boerner, W. M., and Kostinski, A. B., "Concept of the Polarimetric Matched Filter in High Resolution Radar Imaging," AP-S International Symposium, pp. 533–536, Jun. 1988.

Lukert, D. H. and Blanchard, A. J., "Azimuth Depolarization Ambiguities in Synthetic Aperture Radar," International Journal Remost Sens., (UK), vol. 9, No. 3, pp. 527–543, Mar. 1988.

Onstott, R. G., Moore, R. K., Gogineni, S. and Delker, C., "Four Years of Low-Altitude Sea Ice Broad-Band Backscatter Measurements," IEEE Journal Oceanic Engineering, vol. OE7, No. 1, pp. 44–50, Jan. 1982.

van Zyl, J. J., Zebker, A. and Elachi, E., "Imaging Radar Polarization Signatures: Theory and Observation," Radio Science, 22(4), pp. 529–543, Jul./Aug. 1987.

B. D. James, A. B. Kostinski and W. M. Boerner, "Polarimetric Matched Image Filter (PMIF) for POL-SAR Image Interpretation on Ocean Surface Scatter," Proc. of IGARSS '88 Symposium, Edinburgh, Scotland, Sep. 13–16, 1988.

J. J. van Zyl, C. H. Papas and C. Elachi, "On the Optimum Polarizations of Incoherently Reflected Waves," IEEE Trans. on Antennas and Propagation, vol. AP-35, No. 7, Jul. 1987, pp. 818–825.

J. A. Kong, A. A. Swartz, H. A. Yueh, L. M. Novak and R. T. Shin, "Identification of Terrain Cover Using the Optimum Polarimetric Classifier," Jnl. of Electromagnetic Waves & Applications, vol. 2, No. 2, pp. 171–194, 1987.

G. A. Ioannidis and D. E. Hammers, "Optimum Antenna Polarizations for Target Discrimination in Clutter," IEEE Trans. on Antennas and Propagation, vol. AP-27, No. 3, May 1979, pp. 357–363.

*Primary Examiner*—Gilberto Barrón, Jr.
*Attorney, Agent, or Firm*—Thomas H. Jones; Harold W. Adams; John R. Manning

[57] ABSTRACT

A polarization filter can maximize the signal-to-noise ratio of a polarimetric SAR and help discriminate between targets or enhance image features, e.g., enhance contract between different types of target. The method disclosed is based on the Stokes matrix/Stokes vector representation, so the targets of interest can be extended targets, and the method can also be applied to the case of bistatic polarimetric radars.

7 Claims, 5 Drawing Sheets

METHOD FOR PROVIDING A POLARIZATION FILTER FOR PROCESSING SYNTHETIC APERTURE RADAR IMAGE DATA

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to a method for providing a polarization filter for processing synthetic aperture radar (SAR) image data, and more particularly for a filter for maximization of signal-to-noise ratio and a filter for discrimination between areas of different target types by utilizing the vector nature of the return waves in order that information about the surface contained in the polarization properties of the scattered return waves may be recovered.

BACKGROUND ART

Conventional imaging radars operate with a single fixed-polarization antenna for the radio frequency signal transmission and reception. As a consequence, for every resolution element (pixel) in the image, the scattered wave (a vector quantity) is measured as a scalar quantity and any additional information about the surface contained in the polarization properties of the reflected signal is lost. To insure that all the information in the reflected signal is retained, the reflected signal must be measured as a vector, i.e., both the amplitude and the phase should be measured. The greater information derived from the polarized measurements provides a more complete description of the backscatter phenomena of the target area. This greater information can, for example, be used in target discrimination, target classification or feature enhancement. This invention relates to techniques for utilizing polarization information to enhance certain characteristics in SAR images.

Determination of the optimal polarization state to enhance an image has been extensively studied in the past. The scattering matrix co-polarization and cross-polarization nulls represent a solution when the returns from a single point target need to be minimized. A. B. Kostinski and W. M. Boerner, "On the Polarimetric Contrast Optimization," IEEE Trans. Antennas and Propagation, Vol. AP-35, No. 8, pp. 988-991, August 1987, based their analysis on the Graves power matrix to determine the optimum transmit and receive polarizations. This technique is only applicable to maximize the contrast between two specified point targets and has been applied to polarimetric radar images by estimating an equivalent scattering matrix representation for an extended area in an image. B. James, A. B. Kostinski and W. M. Boerner, "Polarimetric Matched Filter for POLSAR Image Interpretation of Ocean Surface Scatter," Proc. IGARSS '88, P. 67, Edinburgh, United Kingdom.

The accuracy of this technique for extended targets is unknown since representation requires either an average Stokes matrix [J. J. van Zyl, A. Zebker and C. Elachi, "Imaging radar polarization signatures: Theory and observation," Radio Science, 22(4), pp. 529-543, July/August 1987; and J. J. van Zyl, C. H. Papas and C. Elachi, "On the optimum polarizations of incoherently reflected waves," IEEE Trans. on Antennas and Propagation," Vol. AP-35, No. 7, July 1987] or an average covariance matrix [J. A. Kong, A. A. Swartz, H. A. Yueh, L. M. Novak and R. T. Shin, "Identification of Terrain Cover Using the Optimum Polarimeter Classifier," J. Electromagnetic Waves and Applications, Vol. 2, No. 2, pp. 171-194, 1988]. Both these representations use the second order statistics of the scattering matrix. G. A. Ioannidis and D. E. Hammers, "Optimum Antenna Polarizations for Target Discrimination in Clutter," IEEE Trans. Antennas Propagat., Vol. AP-27, No. 3, May 1979, introduced a method based on Lagrangian multipliers to solve for the optimal polarization using the Stokes matrix. However, for some cases their solutions violate the constraint that the Stokes vector for the receive antenna must be fully polarized. Additionally, A. A. Swartz, H. A. Yueh, J. A. Kong, L. M. Novak and R. T. Shin, "Optimal Polarizations for achieving Maximum Contrast in Radar Images," J. Geophys. Res., Vol. 93, No. B12, pp. 15252-15260, December 1988, developed a parallel method based on the covariance matrix. However their analysis is restricted to the backscatter case.

STATEMENT OF THE INVENTION

An object of this invention is to provide a polarization filter for maximization of the signal-to-noise ratio of a single target return or maximization contrast between two target types, particularly between man made urban areas and natural nonurban areas (forest, grass, and ocean).

In accordance with the present invention, polarization filters based on Stokes matrix/Stokes vector representation maximizing the signal-to-noise ratio are developed for different noise characteristics and maximizing the contrast between different target types by maximization of the power ratio between target types.

BRIEF DESCRIPTION OF THE DRAWINGS

FIG. 1b illustrates the outlines of different areas of target types and the optimum filter image of the SAR power image of FIG. 1a.

FIG. 7b is the optimum filter image of FIG. 7a, and

DETAILED DESCRIPTION OF THE INVENTION

Figure 1A:
FIG. 1a illustrates the total SAR power image (also known as the Span of the Stokes matrix).

A systematic theoretical analysis and development of a polarization filter is described for two applications: (1) maximization of signal-to-noise ratio and (2) discrimination between two target types. The method employed finds the optimum receive antenna polarization analytically, but relies on a numerical solution to find the optimum transmit antenna polarization. The analysis uses the Stokes matrix representation, and therefore can be employed to analyze the partially polarized scattered field from extended targets and can also be applied to the bistatic case.

Examples of the technique are presented for the monostatic NASA CV990 polarimetric L-band radar which alternately transmits illuminating waves with horizontal (h) and vertical (v) polarization while the receiver employs two channels, one for the horizontally polarized scattered waves (h') and the other for the vertically polarized scattered waves (v') in order that the data received and stored may be processed in a bistatic scattering matrix $$\begin{vmatrix} S_{h'h} & S_{h'v} \\ S_{v'h} & S_{v'v} \end{vmatrix}$$

where: $S_{h'h}$ is the complex ratio of the electric field of the horizontally polarized part of the scattered wave (h') and the horizontally polarized part of the illuminating wave (h);

$S_{h'v}$ is the complex ratio of the electric field of the horizontally polarized part of the scattered wave (h') and the vertically polarized part of the illuminating wave (v);

$S_{v'h}$ is the complex ratio of the electric field of the vertically polarized part of the scattered wave (v') and the horizontally polarized part of the illuminating wave (h); and $S_{v'v}$ is the complex ratio of the electric field of the vertically polarized part of the scattered wave (v') and the vertically polarized part of the illuminating wave (v).

The terminology and definitions used here and hereinafter have previously been defined by J. J. van Zyl, H. A. Zebker and C. Elachi, (July/August 1987) and are incorporated herein by reference.

Image enhancement filters maximizing the signal-to-noise ratio are developed for different noise characteristics and different target types (urban and forest). A filter is also developed to maximize the power ratio between urban and natural (forest or ocean) targets for optimum discrimination between the types of targets. Results are presented to demonstrate that the filter maximizing the contrast between urban and ocean areas is essentially the same as the one maximizing the contrast between urban and forested areas.

Matched Filter in Presence of Background Noise

Let N be a scattering matrix characteristic of the received noise.

$$N = \begin{vmatrix} N_{h'h} & N_{h'v} \\ N_{v'h} & N_{v'v} \end{vmatrix} \quad (1)$$

Each element of N is a complex random variable with zero mean and a known variance $\sigma^2$ (the noise power). Assume that the elements of M are uncorrelated and that the noise of each radar channel has the same power. The mathematical formulation is as follows:

$$\langle N_{ij} N_{kl} \rangle = \sigma^2 \text{ if } i = k \text{ and } j = 1$$
$$= 0 \text{ otherwise}$$
$$\langle N_{ij} \rangle = 0 \text{ for all } i \text{ and } j$$

where $\langle \ \rangle$ denotes the spatial average.

The corresponding average Stokes matrix is of the form:

$$M_N = \begin{vmatrix} \sigma^2 & 0 & 0 & 0 \\ 0 & 0 & 0 & 0 \\ 0 & 0 & 0 & 0 \\ 0 & 0 & 0 & 0 \end{vmatrix} \quad (2)$$

Equation (2) states that the average noise signal is unpolarized when the noise is uncorrelated. Therefore, the noise merely contributes a constant power level to the signal [van Zyl, Papas and Elachi (July 1987)].

To find the polarization configuration of the receive and transmit antenna maximizing the signal-to-noise ratio (SNR), let A be the average Stokes matrix characterizing a target of interest, a $M_N$ be the average Stokes matrix for the noise. Also let $\hat{S}_r$ and $\hat{S}_t$ be the Stokes vectors characterizing some arbitrary polarization configuration of the receive and transmit antennas.

$$S_t = \begin{vmatrix} S_{t0} \\ s_t \end{vmatrix} \text{ and } \hat{S}_r = \begin{vmatrix} S_{r0} \\ s_r \end{vmatrix}$$

where (3)

$$s_r = \begin{vmatrix} S_{r1} \\ S_{r2} \\ S_{r3} \end{vmatrix} \text{ and } s_t = \begin{vmatrix} S_{t1} \\ S_{t2} \\ S_{t3} \end{vmatrix} \quad (3)$$

Because both Stokes vectors represent an antenna configuration, a necessary condition [van Zyl, Papas and Elachi, (July 1987)] is:

$$S_{t0}^2 = s_t \cdot s_t \text{ and } S_{r0}^2 = s_r \cdot s_r. \quad (4)$$

It can be shown [van Zyl, Papas and Elachi, (July 1987)] that the signal-to-noise ratio SNR is given by:

$$SNR = \frac{\hat{S}_r^T A S_t}{\hat{S}_r^T M_N S_t} \quad (5)$$

Without loss of generality, it can be assumed that $S_{r0} = S_{t0} = 1$ since these terms cancel in the ratio.

The received power for a given antenna polarization can be maximized or minimized by maximizing or minimizing $S_{r0}$ and $S_{t0}$. However, in practice $S_{r0}$ and $S_{t0}$ are proportional to the gain of the antennas, which for a given wavelength is determined by their sizes and cannot easily be varied. Consequently, the present invention uses signal polarization characteristics to extract information from SAR data assuming that the gain of the transmit and receive antennas are fixed. Therefore, Equation (4) can be rewritten as:

$$s_r \cdot s_r = 1 \text{ and } s_t \cdot s_t = 1 \tag{6}$$

Assuming uncorrelated noise, the denominator of Equation (5) is constant and equal to $\sigma^2$. Therefore, maximizing the signal-to-noise ratio is equivalent to maximizing the numerator. To optimize SNR, the average Stokes matrix A is written as follows:

$$A = \begin{vmatrix} m & \tilde{u} \\ v & Q \end{vmatrix} \tag{7}$$

where $\tilde{u}$ denotes the transpose of $\hat{u}$ and $\hat{u}$, $\hat{v}$ are 3-element real vectors and Q is a $3 \times 3$ real matrix.

Using Equation (7) for A, an alternate form for the numerator of Equation (5) is:

$$\hat{S}_r^T A \hat{S}_t = m + \hat{u} \cdot s_t + \hat{v} \cdot s_r + s_r \cdot Q s_t \tag{8}$$

This is the expression to be maximized under the constraints expressed in Equation (6), namely the assumption that the gain of the transmit and receive antennas are fixed. However, the solution of constrained maxima for any one of the variables may be extremely difficult. It is therefore desirable to use the Lagrangian multiplier method to solve this problem. After the necessary differentiation, the $s_t$ and $s_r$ that maximizes the SNR is the solution of the equations:

$$\hat{u} + \tilde{Q} s_r = \lambda_1 s_t \tag{9}$$
$$\hat{v} + Q s_t = \lambda_2 s_r \tag{10}$$

where $\lambda_1$ and $\lambda_2$ are the Lagrangian multipliers.

If the transmit antenna is known (i.e., $s_t$ is given), the receive antenna polarization which maximizes the SNR is determined from Equations (6) and (9) to be as follows:

$$s_r = \frac{\hat{v} + Q s_t}{\| \hat{v} + Q s_t \|} \tag{11}$$

where $\| \ \|$ denotes the norm. Physically, Equation (11) states that the power is maximized when the polarization of the receive antenna is matched to the polarization of the scattered wave incident upon the receive antenna.

The transmit antenna polarization $s_t$ must then satisfy:

$$(\tilde{Q} Q - \lambda_1 \lambda_2 I) s_t = -\tilde{Q} \hat{v} - \lambda_2 \hat{u} \tag{12}$$

When Equation (11) is satisfied, the numerator of Equation (5) can then be written:

$$P_{max} = m + \hat{u} \cdot s_t + | \hat{v} + Q s_t | \tag{13}$$

where $P_{max}$ is the maximum obtainable scattered power given the transmit antenna polarization.

It is hard to analytically solve for the transmit polarization which would maximize $P_{max}$. Instead, this optimum transmit polarization may be found numerically, as will be shown below under the heading Numerical Examples.

Matched Filter as a Discriminator Between Two Target Classes

One objective of this invention is to find the polarization of the receive and transmit antennas which maximizes the ratio of signal power scattered by one type of target to that scattered by another type of target. Let $F^{(1)}$ represent the Stokes matrix characteristic of target No. 1 and $F^{(2)}$ represent the Stokes matrix characteristic of target No. 2. The problem then is to find the Stokes vectors $\hat{S}_r$ and $\hat{S}_t$ representing the receive and transmit antenna polarization realizations which maximize:

$$\frac{P^{(1)}}{P^{(2)}} = \frac{\hat{S}_r^T F^{(1)} \hat{S}_t}{\hat{S}_r^T F^{(2)} \hat{S}_t} \tag{14}$$

But first it is necessary to solve the following problem. Assuming the transmit antenna polarization is fixed, only the receive antenna is to be operated upon to maximize the power ratio given by Equation (14). $S_1$ and $S_2$ are defined as follows:

$$\hat{S}_1 = F^{(1)} \hat{S}_t = \begin{vmatrix} S_{01} \\ s_1 \end{vmatrix} \tag{15}$$

$$\hat{S}_2 = F^{(2)} \hat{S}_t = \begin{vmatrix} S_{02} \\ s_2 \end{vmatrix} \tag{16}$$

$\hat{S}_r$, the Stokes vector of the receive antenna, can be written as:

$$\hat{S}_r = \begin{vmatrix} S_{r0} \\ s_r \end{vmatrix} \tag{17}$$

As before, since $\hat{S}_r$ represents the Stokes matrix of an antenna, it is a completely polarized wave and hence must satisfy:

$$S_{r0}^2 = s_r \cdot s_r = 1 \tag{18}$$

It is clear that to maximize the ratio given by Equation (14), it is necessary to maximize the contrast $$C(s_r) = \frac{S_{01} + s_r \cdot s_1}{S_{02} + s_r \cdot s_2} \tag{19}$$

Since $C(s_r)$ is the ratio of two received powers, it is reasonable to insist that:

$$C(s_r) \geq 0. \tag{20}$$

To maximize the contrast between the two targets, one has to maximize the return from the one target, while at the same time minimizing the return from the other target. For the moment, assume that there is no antenna polarization which could cause the denominator of Equation (19) to become zero and then generalize the result. To optimize $C(s_r)$ subject to the constraint condition given by Equation (18), Lagrangian multipliers are introduced. After performing the necessary differentiations, it is found that the optimum polarizations are the solutions to $$s_1 - s_2 \left( \frac{S_{01} + s_r \cdot s_1}{S_{02} + s_r \cdot s_2} \right) = \mu s_r, \quad (21)$$

where $\mu$ is the Lagrangian multiplier. Introducing a shorthand term $$\alpha = \frac{S_{01} + s_r \cdot s_1}{S_{02} + s_r \cdot s_2}, \quad (22)$$

Equation (21) can be rewritten to read $$s(\alpha) = \mu s_r$$

$$s(\alpha) \equiv s_1 - \alpha s_2.$$

From Equations (23) and (18) it follows that $$\mu = \pm \sqrt{s(\alpha) \cdot s(\alpha)}, \quad (24)$$

and the optimum polarizations are therefore described by $$s_r = \pm \frac{s(\alpha)}{\sqrt{s(\alpha) \cdot s(\alpha)}}. \quad (25)$$

Notice that $s_r$, as expressed in Equation (25), always represents a fully polarized wave consistent with the constraint in Equation (18). A previous analysis by Ionnadis and Hammers (1979) found the optimum receive antenna Stokes vector:

$$\hat{S}_r = \frac{1}{\mu} R(F^{(1)} - pF^{(2)})S_t = \frac{1}{\mu} \hat{S}_1 \frac{p}{\mu} \hat{S}_2 \quad (26)$$

where p is a Lagrangian multiplier. In general, $S_1$ and $S_2$ represent partially polarized waves if $F^{(1)}$ and $F^{(2)}$ are Stokes matrices of extended targets. There is therefore no guarantee that the difference $\hat{S}_r$ would be a fully polarized Stokes vector.

In Equation (25), $\alpha$ is still unknown. That unknown can be solved by substituting the expression for $s_r$ in Equation (25) into the definition of $\alpha$ given in Equation (22). This produces the optimum values of $\alpha$ that are the roots of the quadratic:

$$(S_{02}^2 - s_2 \cdot s_2)\alpha^2 - 2(S_{01}S_{02} - s_1 \cdot s_2)\alpha + (S_{01}^2 - s_1 \cdot s_1) = 0 \quad (27)$$

If $S_{02}^2 \neq s_2 \cdot s_2$, the optimum values of $\alpha$ are $$\alpha_{max} = \frac{S_{01}S_{02} - s_1 \cdot s_2}{S_{02}^2 - s_2 \cdot s_2} + \quad (28a)$$

$$\sqrt{\left( \frac{S_{01}S_{02} - s_1 \cdot s_2}{S_{02}^2 - s_2 \cdot s_2} \right)^2 - \frac{S_{01}^2 - s_1 \cdot s_1}{S_{02}^2 - s_2 \cdot s_2}}$$

and $$\alpha_{min} = \frac{S_{01}S_{02} - s_1 \cdot s_2}{S_{02}^2 - s_2 \cdot s_2} - \quad (28b)$$

$$\sqrt{\left( \frac{S_{01}S_{02} - s_1 \cdot s_2}{S_{02}^2 - s_2 \cdot s_2} \right)^2 - \frac{S_{01}^2 - s_1 \cdot s_1}{S_{02}^2 - s_2 \cdot s_2}}$$

From Equations (19) and (20), it is clear that $\alpha$ is also the ratio to optimize, and therefore Equations (28a and b) also define the optimum values of the contrast ratio, $C(s_r)$. It can be proven that the contrast ratios given in Equations (28) are real, positive and definite values.

Substituting Equations (28a) and (28b) in Equation (23) and substituting the resulting expression in Equation (25), it is found that only the solutions with positive signs lead to self-consistent results for the contrast ratio. Therefore, the optimum antenna polarizations are:

$$s_{rmax} = \frac{s(\alpha_{max})}{||s(\alpha_{max})||} \quad (29a)$$

and $$s_{rmin} = \frac{s(\alpha_{min})}{||s(\alpha_{min})||}. \quad (29b)$$

Now notice that when $S_{02}^2 \neq s_2 \cdot s_2$, the scattered wave in the denominator of Equation (19) is completely polarized. The maximum contrast in this case is obviously obtained when an antenna polarization which nulls the received power from the completely polarized wave is used to receive the scattered waves, leading to an infinite contrast ratio. The receive antenna polarization is thus chosen to be orthogonal to the completely polarized scattered wave:

$$s_{rmax} = -\frac{s_2}{\sqrt{s_2 \cdot s_2}} \quad (30)$$

To find the minimum contrast ratio for this case, return to Equation (23) and find that the quadratic reduces to the first order polynomial with $$\alpha_{min} = \frac{s_{01}^2 - s_1 \cdot s_1}{2(S_{01}S_{02} - s_1 \cdot s_2)} \quad (31)$$

Notice that $\alpha_{min}$ as given by Equation (31) is the ratio of two positive quantities and therefore satisfies Equation (18).

Note that if the scattered wave in the numerator of Equation (18) is completely polarized, the minimum contrast ratio is zero which is achieved by using the antenna polarization which nulls the received power from this completely polarized wave. When both waves are completely polarized, the minimum contrast (which is zero) is achieved by using the antenna polarization which nulls the received power from the completely polarized wave in the numerator of the contrast ratio. The maximum contrast (which is finite) is achieved by using the antenna polarization which nulls the received power from the completely polarized wave in the denominator of the contrast ratio.

Finally, it should be noted that if the $F^{(2)}$ matrix appearing in the denominator of Equation (14) is a noise matrix as defined in Equation (2), then from Equations (16) and (21) $s_2 = 0$ and $$s_r = \frac{s_1}{\|s_1\|} \tag{32}$$

where $s_1 = \hat{v} + Qs_r$. This result agrees with Equation (2).

The equations derived in this section describe the optimum receive antenna polarization for maximum contrast ratio given the transmit antenna polarization. Furthermore, Equation (28a) expresses the maximum contrast ratio obtainable given the transmit antenna polarization state. The next logical step is to vary the transmit antenna polarization to maximize the contrast over all possible configurations. Attempts to find an analytical solution for the optimum transmit polarization lead to extremely complicated nonlinear equations. Instead of solving these, this invention presents a simpler hybrid method in which the optimum transmit polarizations are found numerically by calculating the maximum and/or minimum contrast ratio. The corresponding receive polarizations are calculated using Equations (28) and (29) for all possible transmit polarizations. This hybrid method is illustrated with several examples in the following section.

Numerical Examples

The procedures developed in the previous sections were tested with data acquired with the NASA CV990 SAR operating at L band. This radar is monostatic and emits alternately horizontally and vertically polarized waves and receives both returns with two co-located antennas, one horizontally polarized and the other vertically polarized. The system is therefore able to measure a full scattering matrix for each of the 12×4 meter resolution cells.

Figure 1B:
Figure 1C:
FIG. 1c illustrates the enhancement factor image which is the ratio of the two other images.
Figure 1D:
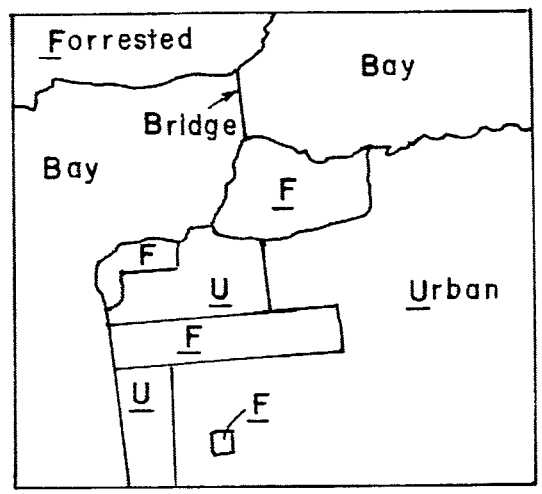
FIG. 1d shows the outlines of different areas of target types and gives the position of two studied sites; No. 1 is a forested area site and No. 2 is an urban area site.

The first test was to minimize the impact of background noise using the matched filter approach in the presence of background noise described above. A second test was to demonstrate the use of a polarimetric matched filter to discriminate between man-made targets and natural targets. A SAR image shown in FIG. 1 of San Francisco acquired in 1985 was used in both examples. It was chosen because of the diversity of the target types as well as the availability of the ground truth. FIG. 1a is the total power image, i.e., the (1,1) element of the Stokes matrix. FIG. 1b is the matched filter output simulating 45° linearly cross polarized radar. FIG. 1c is the enhancement factor image given by Equation (34) below. FIG. 1d is an outline of different major target areas, namely urban, forested and ocean. The data presented in the following examples have been relatively calibrated as that term is defined by Zebker, et al., (1986) "Imaging Radar Polarimetry from Wave Synthesis," J. Geophys., Res., Vol. 92, No. B1, pp. 683–701, January 1987, but not absolutely calibrated.

EXAMPLE A: SIGNAL-TO-NOISE RATIO MAXIMIZATION (VEGETATION, MAN-MADE TARGETS AND OPEN WATER)

First the matched filter approach is applied to maximize the signal to noise ratio. For a given target, the optimum receive polarization can be analytically computed for each transmit polarization. If implemented with sufficiently small increments, a numerical search over all polarizations of the transmit antenna will yield a global maximum of the signal-to-noise ratio as well as the corresponding receive antenna polarization configuration. This search process can be visualized through an "optimization signature" which is here introduced and defined as a 3D plot where the two horizontal axes describe the polarization of the transmit wave, one axis being the ellipticity angle, the other the orientation angle. The maximum signal-to-noise ratio, calculated using Equation (12) at each transmit polarization is displayed along the vertical axis. The highest point of the surface will therefore be the global maximum of the signal-to-noise ratio while its horizontal coordinates describe the polarization of the optimal transmit antenna. The receive antenna polarization is computed with Equation (9).

An optimization signature is displayed for two different types of targets. For the man-made target area No. 2, shown in FIG. 1d, the Stokes matrix is given by:

$$F^{(u)} = \begin{vmatrix} 291.94 & 17.35 & 29.42 & 14.66 \\ 17.35 & 229.70 & 83.09 & -12.73 \\ 29.42 & 83.09 & -42.83 & -22.89 \\ 14.66 & -12.73 & -22.89 & 105.07 \end{vmatrix} \tag{33}$$

The corresponding optimization signature indicates that the maximum signal-to-noise ratio occurs for a transmit polarization of about 10° orientation angle and 0° ellipticity angle. The exact numbers are $\psi_t = 10.0°$; $\chi_t = 0.0°$; $\psi_r = 9.8°$; $\chi_r = -5°$.

For the natural target area, the Stokes matrix is:

$$F^{(f)} = \begin{vmatrix} 63.63 & -6.83 & 4.87 & 1.29 \\ -6.83 & 32.17 & 1.64 & -3.82 \\ 4.87 & 1.64 & 1.92 & 3.33 \\ 1.29 & -3.82 & 3.33 & 12.29 \end{vmatrix} \tag{34}$$

Figure 3:
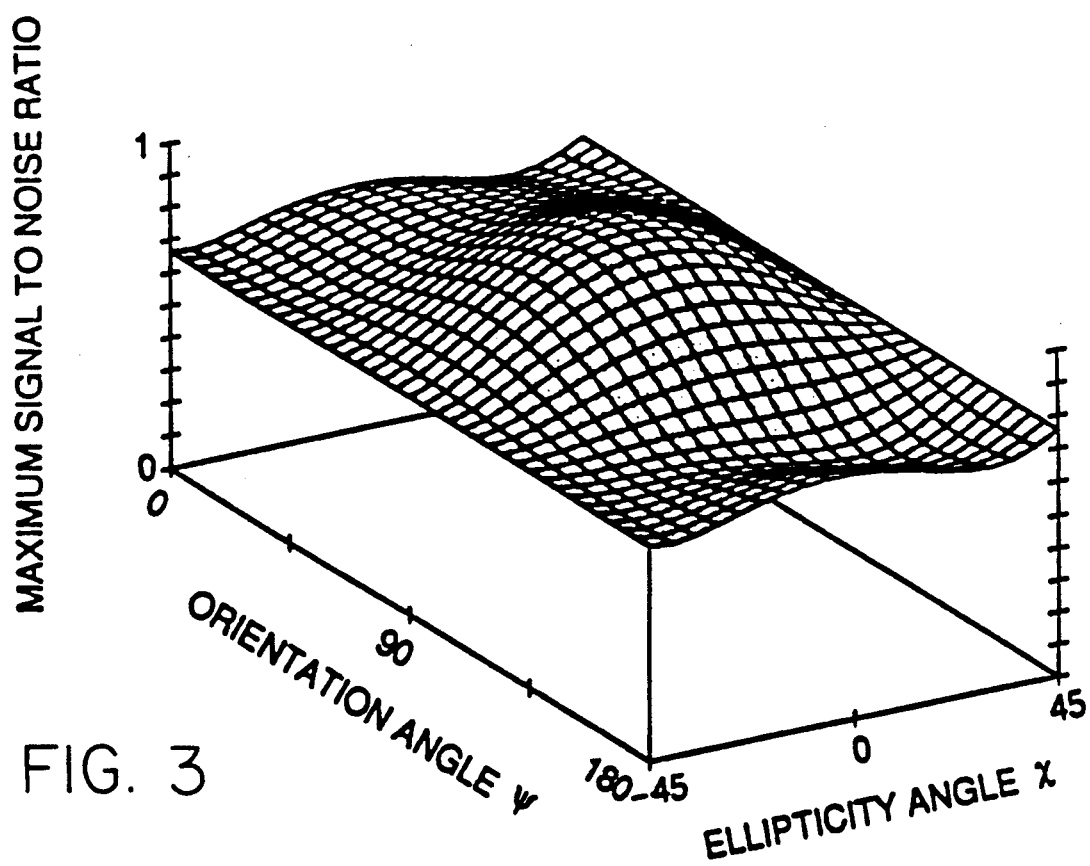
FIG. 3 illustrates an optimization signature maximization of signal-to-noise ratio for a forested area.

The corresponding optimization signature shown in FIG. 3 indicates that the maximum signal-to-noise ratio occurs for a transmit polarization of about 85° orientation angle and 5° ellipticity angle. The exact numbers in this case are $\psi_t = 85.0°$; $\chi_t = 5.0°$; $\psi_r = 84.7°$; $\chi_r = -5.6°$.

EXAMPLE B: DISCRIMINATION BETWEEN MAN-MADE AND NATURAL AREAS.

Figure 4:
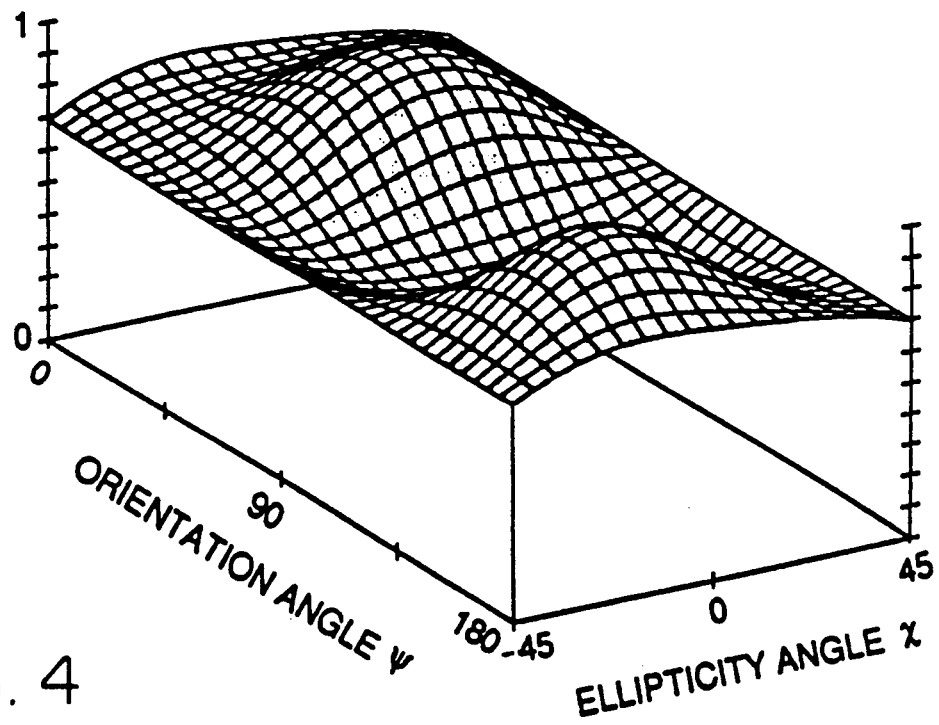
FIG. 4 illustrates an optimization signature maximization of contrast ratio between urban and forested areas.

The matched filter approach described above as a discriminator between two classes is used as follows: Two typical target areas are chosen as training sites, the first a forested area No. 1 and the second an urban area No. 2 indicated in FIG. 1d by small rectangles. The two areas are similar in both size and radar viewing angle. The corresponding polarization matched filter is computed using the two experimentally determined Stokes matrices. An optimization signature, as defined in the previous paragraph, is determined and presented in FIG. 4. For this test, the vertical axis is the normalized contrast ratio defined by Equation (13) where the maximum contrast ratio is normalized to 1. The peak of the surface occurs for a transmit polarization with 7.5° ellipticity angle and 47.5° orientation angle. This procedure is repeated for twenty target pairs. The polarization of the optimal transmit and receive antennas is shown as a scatter plot in FIG. 5. The resulting orientation and ellipticity angles cluster well around $\psi_R = 45°$ and $\chi_R = 0°$, $\psi_T = 135°$ and $\chi_T = 0°$. This corresponds to a linearly cross-polarized radar oriented at 45° from horizontal. As a measure of the performance of the filtering method, we define an enhancement factor as follows:

$$\frac{P^{urb}}{P^{for}} = \frac{\hat{S}_r{}^T F^{urb} \hat{S}_t}{\hat{S}_r{}^T F^{for} \hat{S}_t} \frac{P_{11}^{for}}{P_{11}^{urb}} \quad (35)$$

The enhancement factor is therefore a measure of how radar polarization provides discrimination between targets as a standalone tool (i.e., without utilizing the target characteristics).

Figure 5:
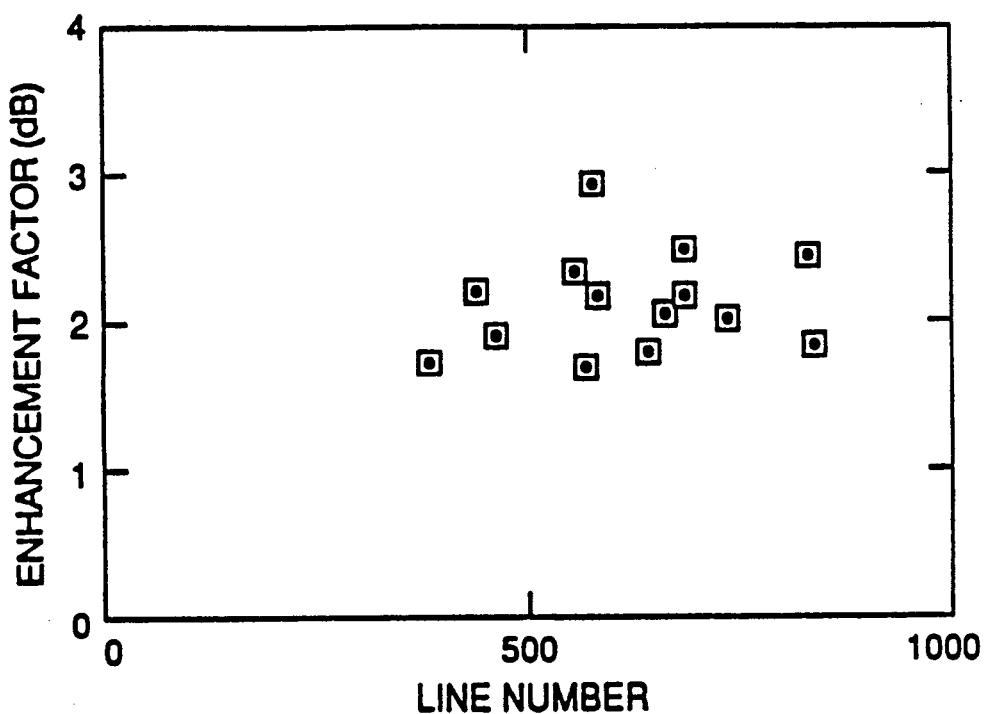
FIG. 5 is a graph of enhancement factor variation with range line. The line 0 is the near range and line 1000 is the far range of the SAR image.
Figure 6:
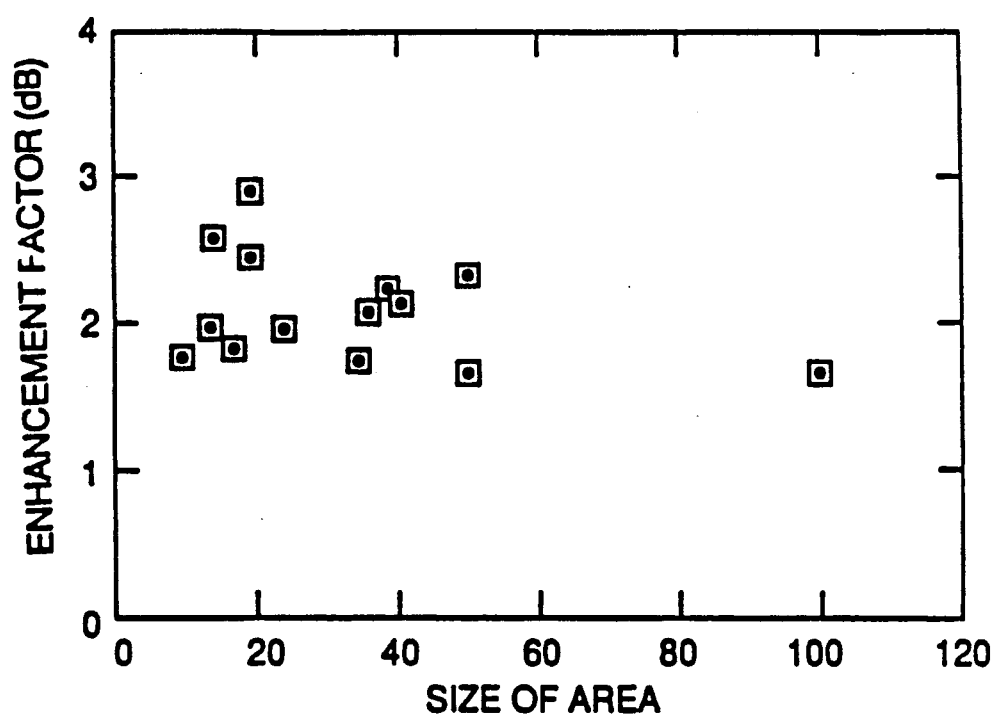
FIG. 6 is a graph of enhancement factor variation with size of training area. The training area contains $n^2$ pixels.

FIG. 5 shows that for this example the enhancement factor is about 3.0 dB and is range independent. The size of the training area does not seem to have an influence on the enhancement factor as shown in FIG. 6. This provides a qualitative representation of polarization image enhancement.

Figure 7A:
FIG. 7a illustrates the total power image (also known as Span of the Stokes matrix) of the Blackwater River area.
Figure 7B:
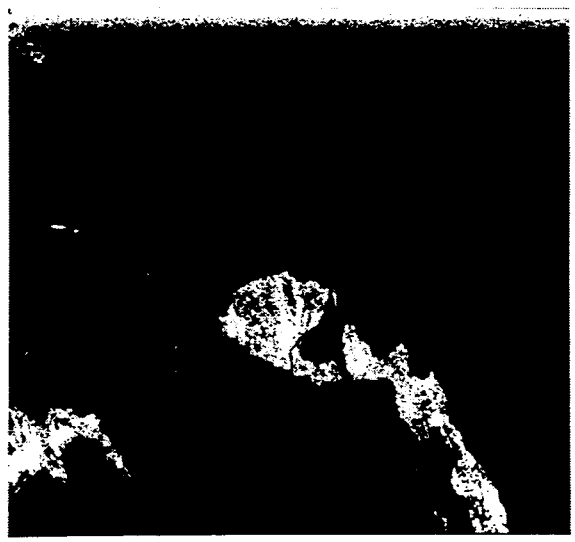
Figure 7C:
FIG. 7c is the enhancement factor image of FIG. 7a, which is the ratio of the two other images.

This procedure was also applied to maximize the contrast between urban and ocean areas. The resulting optimum filter is found to be essentially the same as the one optimizing the contrast between urban and forested areas. FIG. 7 displays the effect of the filter on an ocean scene. FIG. 7a is the total power image, FIG. 7b is the filtered image simulating a 45° linearly cross-polarized radar and FIG. 7c is the enhancement factor. This filter seems to be a good urban/natural discriminator independent of the type of natural targets.

If the uncorrelated noise described with reference to Equations (1) through (12) is symmetrized before averaging, the corresponding Stokes matrix will have a different form. Let $\hat{N}$ be the symmetrized scattering matrix. We have:

$$\hat{N}_{hv} = \hat{N}_{vh} = \tfrac{1}{2}(N_{hv} + N_{vh}) \quad (36)$$

Therefore, the corresponding Stokes matrix, $M_N$ is written:

$$\hat{M}_N = \frac{1}{4} \begin{vmatrix} 3\alpha^2 & 0 & 0 & 0 \\ 0 & \alpha^2 & 0 & 0 \\ 0 & 0 & \alpha^2 & 0 \\ 0 & 0 & 0 & \alpha^2 \end{vmatrix} \quad (37)$$

Figure 2:
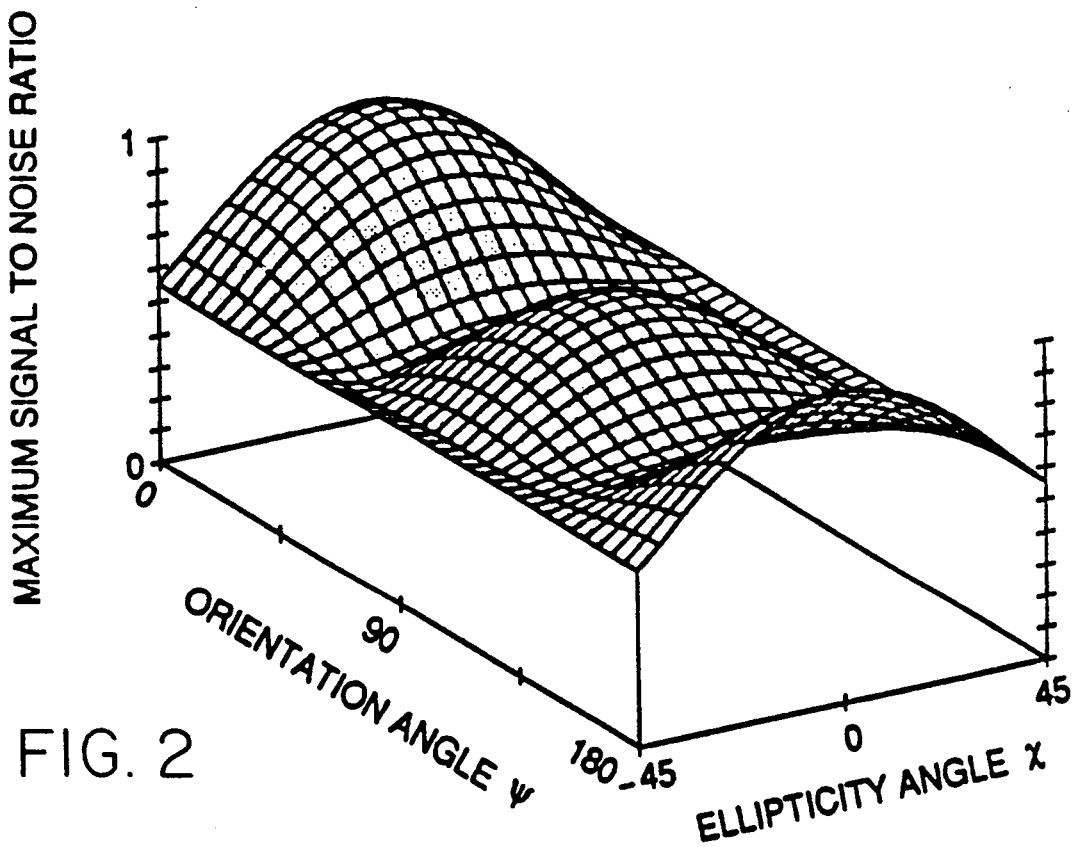
FIG. 2 illustrates an optimization signature maximization of signal-to-noise ratio for an urban area.
Figure 8:
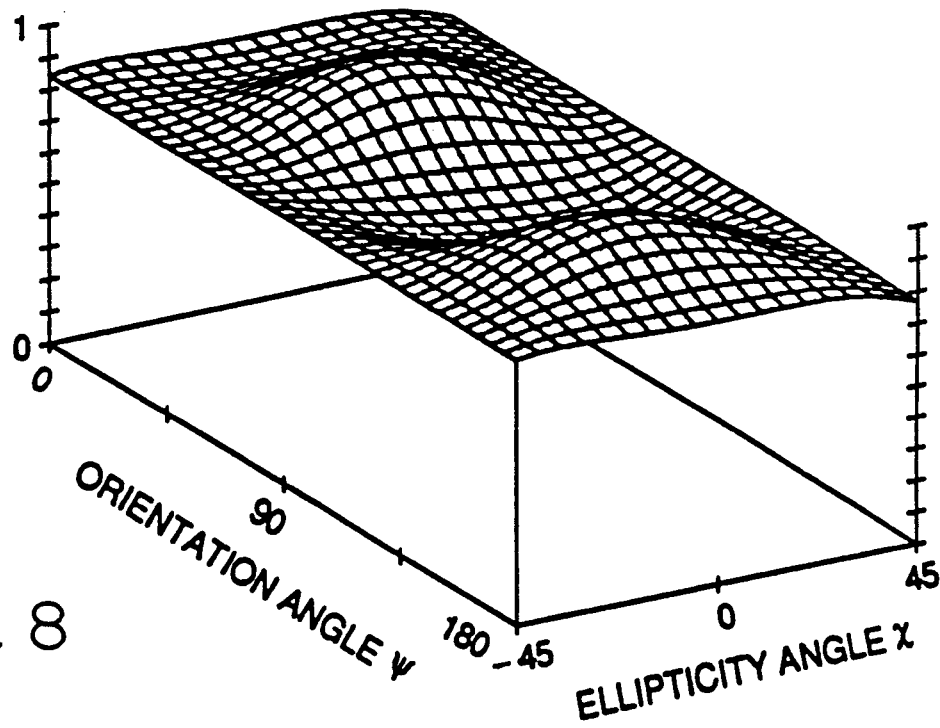
FIG. 8 illustrates an optimization signature maximization of signal-to-noise ratio for an urban area with symmetrized noise.

Maximizing the signal-to-noise ratio in this case results in implementing the procedure developed with reference to Equations (14) through (32) with $F^{(1)}$ being the signal Stokes matrix of (e.g., a man-made target) and $F^{(2)}$ being $\hat{M}_N$. A test was conducted on the man-made target Stokes matrix $F^{(u)}$ described with reference to Equation (33) in the previous paragraph. The optimization signature FIG. 8 is to be compared with the optimization signature of FIG. 2. The effect of symmetrized noise is clearly noticeable in FIG. 8. The optimum polarization configuration for the receive antenna and the transmit antenna is now $\psi_t = 147.5°$, $\chi_t = -2.5°$, $\psi_r = 48.9°$, $\chi_r = 3.8°$.

Conclusion

The most important result of this invention is the development of an optimum polarization filter either for (1) maximization of a single target return or (2) contrast enhancement between two target types. Because the filter is based on the Stokes matrix representation, it is not restricted to point targets and can be applied to extended targets. The filter is also equally valid for bistatic and monostatic radar data.

The invention is first embodied in a filter which maximizes contrast between urban and natural targets. The same filter was found to be optimum when the natural target is water, forest, or grass field. Results show that this optimum filter improves the contrast ratio by about 3 dB, and that this enhancement is essentially independent of the incidence angle.

The optimization signature discussed is a useful tool as it indicates both the variation and maxima of the contrast ratio as a function of the receive antenna polarization. The polarization resulting in the maximum contrast ratio defines the optimum filter. The robustness of this filter is related to the variation of the optimization signature surface in the neighborhood of the maximum contrast polarization. For example, a rapidly varying surface implies that the filter performance degrades quickly when small errors occur in polarization realization. Such small errors can result from system imperfections such as crosstalk.

What is claimed is:

1. In a polarimetric synthetic aperture radar imaging system, a method for polarization filtering in order to maximize the signal-to-noise ratio comprising the steps of assuming a constant gain of said transmit and receive antennas and assuming uncorrelated noise as a first step, then maximizing $\hat{S}_r{}^T A \hat{S}_t$, as a second step where $\hat{S}_t$ and $\hat{S}_r{}^T$ are the Stokes vectors characterizing some arbitrary polarization configuration of said transmit and receive antennas, and A is the average Stokes $4 \times 4$ real matrix $$A = \begin{vmatrix} m & \tilde{u} \\ \hat{v} & Q \end{vmatrix}$$

where u denotes the transpose of $\hat{u}$,
u and are 3-element real vectors, and
Q is a $3 \times 3$ real matrix, by maximizing the expression $$\hat{S}_r{}^T A \hat{S}_t = m + \hat{u} \cdot s_t + \hat{v} \cdot s_r + s_r \cdot Q s_t$$

using the Lagrangian multiplier method to produce the equations $$\tilde{u} + Q s_r = \lambda_1 s_t$$

$$\hat{v} + Q s_t = \lambda_2 s_r$$

where $\lambda_1$ and $\lambda_2$ are the Lagrangian multipliers, and $s_t$ and $s_r$ are Stokes vectors characterizing transmit and receive antennas, and having a known Stokes vector for the transmit antenna determining the receive antenna polarization which maximizes the signal-to-noise ratio as a third step from the equation $$s_r = \frac{\hat{v} + Q s_t}{||\hat{v} + Q s_t||}$$

where $||\ ||$ denotes the norm, thereby effectively maximizing received power by matching the polarization of the scattered wave incident upon the receive antenna with polarization of the receive antenna such that power P is maximized under the constraints of assumptions set forth in the first step above in accordance with the equation $$P_{max} = \hat{S}_r^T A \hat{S}_t = m + \hat{u} \cdot s_t + \hat{v} \cdot s_r + s_r \cdot Q s_t.$$

2. In a synthetic aperture radar imaging system as defined in claim 1, a method for maximizing the ratio of signal power $p^{(1)}$ scattered by one type of target to the signal power $p^{(2)}$ scattered by another type of target in order to maximize the ratio of the powers scattered by two different types of targets comprising the steps of first assuming the transmit antenna polarization is such that the Stokes vector of the transmit antenna for the two target types are defined as $$\hat{S}_1 = F^{(1)}\hat{s}_t = \begin{vmatrix} s_{01} \\ s_1 \end{vmatrix}$$

$$\hat{S}_2 = F^{(2)}\hat{s}_t = \begin{vmatrix} s_{02} \\ s_2 \end{vmatrix}$$

and the Stokes vector of the receive antenna is defined as $$\hat{S}_r = \begin{vmatrix} s_{r0} \\ s_r \end{vmatrix}$$

where $\hat{S}_r$ is a completely polarized wave that satisfies $$s_{r0}^2 = s_r \cdot s_r = 1$$

and as a second step maximizing the contrast $$C(s_r) = \frac{s_{01} + s_r \cdot s_1}{s_{02} + s_r \cdot s_2}.$$

3. A method as defined in claim 2 wherein the second step of maximizing contrast $C(s_r)$ subject to the constraint that $S_{r0}^2 = s_r \cdot s_r = 1$ is carried out by introducing Lagrangian multipliers and after performing differentiation finding that the optimum polarizations are the solutions to $$s_1 - s_2 \frac{s_{01} + s_r \cdot s_1}{s_{02} + s_r \cdot s_2} = \mu s_r$$

where $\mu$ is the Lagrangian multiplier.

4. A method as defined in claim 2, wherein a shorthand term $$\alpha = \frac{s_{01} + s_r \cdot s_1}{s_{02} + s_r \cdot s_2}$$

is introduced, and the equation $$s_1 - s_2 \frac{s_{01} + s_r \cdot s_1}{s_{02} + s_r \cdot s_2} = \mu s_r$$

is rewritten using that shorthand term as $s(\alpha) = \mu s_r$ where $s(\alpha) \equiv s_1 - \alpha s_2$ such that $$\mu = \pm \sqrt{s(\alpha) \cdot s(\alpha)}$$

and the optimum polarizations are therefore $$s_r = \pm \frac{s(\alpha)}{\sqrt{s(\alpha) \cdot s(\alpha)}}$$

which always represents a fully polarized wave, and then solving for $\alpha$, an unknown, by substituting the expression $$\pm \frac{s(\alpha)}{\sqrt{s(\alpha) \cdot s(\alpha)}}$$

for $s_r$ into the equation $$\alpha = \frac{s_{01} + s_r \cdot s_1}{s_{02} + s_r \cdot s_2}$$

to produce the quqadratic $$(s_{02}^2 - s_2 \cdot s_2)\alpha^2 - 2(s_{01}s_{02} - s_1 \cdot s_2)\alpha + (s_{01}^2 - s_1 \cdot s_1) = 0$$

whereby the optimum values of $\alpha$ if $S_{02}^2 \neq s_2 \cdot s_2$ $$\alpha_{max} = \frac{s_{01}s_{02} - s_1 \cdot s_2}{s_{02}^2 - s_2 \cdot s_2} + \sqrt{\left(\frac{s_{01}s_{02} - s_1 \cdot s_2}{s_{02}^2 - s_2 \cdot s_2}\right)^2 - \frac{s_{01}^2 - s_1 \cdot s_1}{s_{02}^2 - s_2 \cdot s_2}}$$

and $$\alpha_{min} = \frac{s_{01}s_{02} - s_1 \cdot s_2}{s_{02}^2 - s_2 \cdot s_2} - \sqrt{\left(\frac{s_{01}s_{02} - s_1 \cdot s_2}{s_{02}^2 - s_2 \cdot s_2}\right)^2 - \frac{s_{01}^2 - s_1 \cdot s_1}{s_{02}^2 - s_2 \cdot s_2}}$$

which define optimum values of said contrast ratio $C(s_r)$ that are real, positive and definite values.

5. A method as defined in claim 4 wherein equations for $\alpha_{max}$ and $\alpha_{min}$ are substituted in equation $$s_a - \alpha s_2 = \mu s_r$$

and substituting the resulting expression for $\alpha$ in said equation $$s_r = \pm \frac{s(\alpha)}{\sqrt{s(\alpha) \cdot s(\alpha)}}$$

to find the optimum antenna polarizations to be $$s_{rmax} = \frac{s(\alpha_{max})}{\| s(\alpha_{max}) \|}$$

and $$s_{rmin} = \frac{s(\alpha_{min})}{\| s(\alpha_{min}) \|}$$

where $\| \; \|$ denotes the norm, and choosing the receiver antenna polarization to be orthogonal to the completely polarized scattered wave $$s_{rmax} = -\frac{s_2}{\sqrt{s_2 \cdot s_2}}$$

for maximum contrast ratio, thereby providing an optimum receive antenna polarization for maximum contrast ratio for a given transmit antenna polarization.

6. A method as defined in claim 5 including the step of varying the transmit antenna polarization to maximize contrast between targets of different types over all possible configurations.

7. A method as defined in claim 6 wherein said different types of targets are man made in urban areas for one type and natural in nonurban areas for the other type, said natural type including forest, grass and ocean areas.

* * * * *